UNITED STATES PATENT OFFICE.

RAYMOND VIDAL, OF PARIS, FRANCE.

BLACK DYE AND PROCESS OF MAKING SAME.

SPECIFICATION forming part of Reissued Letters Patent No. 11,659, dated April 5, 1898

Original No. 523,138, dated July 17, 1894. Application for reissue filed February 26, 1898. Serial No. 668,908.

*To all whom it may concern:*

Be it known that I, RAYMOND VIDAL, a citizen of the Republic of France, residing in Paris, France, have invented certain new and useful Improvements in Black Dyestuffs Dyeing without Mordants, of which the following is a specification.

This invention has reference to an improved process of producing greenish-black, bluish-black, and black dyestuffs which can be used for dyeing textile fabrics without the use of mordants; and the invention consists of the process of producing these dyestuffs by subjecting ortho or para dioxybenzenes to the action of heat in the presence of sulfur and ammonia or other substances which are capable of liberating ammonia during the reaction; and the invention consists, further, of the products of this reaction.

In carrying out my improved process a series of dyestuffs is obtained by which the unmordanted fibers are directly dyed in a greenish-black, bluish-black, or black color by the reaction on one of the ortho or para dioxybenzenes of sulfur in the presence of ammonia or a fatty amin. The ammonia or the fatty amin may be employed in its free state or in such combinations which are susceptible of producing the desired colors in the course of the reaction.

The process can be carried out either in open or closed vessels at temperatures varying between 130° and 210° centigrade. The shade of the dyestuffs obtained varies according to the nature of the substances and temperature employed.

The following proportions have given good results: twenty pounds of quinone, ten pounds of sulfur, eight pounds of ammonia chlorid, twelve pounds of caustic soda. They are heated in a closed vessel for five hours at a temperature of 160° to 210° centigrade. At the end of this time the mass is permitted to cool. It is then pulverized and forms a dyestuff which can be used for dyeing without further purification.

When an aqueous solution of these crude dyestuffs is subjected to the more or less extended action of sulfuric acid, various shades of colors may be obtained. The addition of sulfuric acid liberates sulfureted hydrogen, while simultaneously the greater portion of the coloring-matter is precipitated from the solution. The precipitated coloring-matter is soluble in caustic soda and quickly soluble with a greenish-black shade in alkaline sulfites, in which form vegetable fibers are dyed in a grayish-blue, bluish-black, and black color. On the other hand, the uncolored acid liquor, from which the precipitate is separated by filtration, dyes after neutralization by caustic soda either by the oxygen of the air or by oxidizing agents and imparts an intensely violet-blue color. This coloring-matter, which is obtained only in small quantities, dyes the woolen fiber in the neutral bath violet-blue, in the acid-bath "orseille-red."

When quinone is replaced by hydroquinone, the reaction takes place in an analogous manner. The resulting product is a dark mass insoluble in water and in acids, soluble in alkalies and alkaline sulfites. The alkaline solutions are readily oxidized on exposure to air and thereupon become intensely black. They dye unmordanted fiber a deep black, resistant to light, soaps, acid, and friction. Other dyestuffs are obtained when in the example before given the quinone is replaced by toluquinone or pyrocatechin or the ammonia by a fatty amin, such as the mono or di methylamin.

The various dyestuffs thus obtained may be used for dyeing either in their crude form or in their purified form by subjecting them to the before-described treatment with sulfuric acid; but in any case it is necessary for being used in dyeing that a suitable quantity of sodium sulfite be added, of which, in practice, from two to three times the weight of the coloring-matter may be used.

Having thus described my invention, I claim as new and desire to secure by Letters Patent—

1. The process herein described of producing greenish-black, bluish-black and black dyestuffs capable of dyeing the fiber without mordants, which consists in heating ortho or para dioxybenzene, such as quinone, hydroquinone, toluquinone, or pyrocatechin in the presence of sulfur and of ammonia or of substances which are capable of generating ammonia during the reaction, substantially as set forth.

2. The process herein described of producing black dyestuff, by heating hydroquinone in presence of sulfur and ammonia, substantially as set forth.

3. The described black coloring-matters, derived from ortho or para dioxybenzene by heating with sulfur and ammonia, said coloring-matters being soluble in alkalies and alkaline sulfites, and capable of dyeing unmordanted cotton fiber in black or blackish shades, substantially as described.

4. The described coloring-matter derived from hydroquinone by heating with sulfur and ammonia, said coloring-matter being a dark mass, insoluble in water or acids, soluble in alkalies and alkaline sulfites, the alkaline solutions being readily oxidized on exposure to air thereby becoming intensely black, and capable of dyeing unmordanted cotton fiber in black shades, substantially as set forth.

In testimony whereof I have signed this specification in presence of two subscribing witnesses.

RAYMOND VIDAL.

Witnesses:
EDWARD P. MACLEAN,
ANTOINE ROUSSANNES, Jr.